United States Patent
Coleman et al.

(10) Patent No.: US 6,471,074 B2
(45) Date of Patent: Oct. 29, 2002

(54) CANDY HOLDER WITH SPRING-UPS

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

( * ) Notice: Subject to any disclaimer, the term of this patent is extended or adjusted under 35 U.S.C. 154(b) by 0 days.

(21) Appl. No.: 09/994,883

(22) Filed: Nov. 28, 2001

(65) Prior Publication Data

US 2002/0113029 A1 Aug. 22, 2002

Related U.S. Application Data

(63) Continuation-in-part of application No. 09/480,852, filed on Jan. 11, 2000, now abandoned.

(51) Int. Cl.⁷ .................................................. A47F 7/00
(52) U.S. Cl. ...................................... 211/49.1; 221/198
(58) Field of Search ............................... 211/49.1, 59.3, 211/59.1; 221/232, 268–269, 271, 198, 199, 65, 279, 312 A; 206/535–537

(56) References Cited

U.S. PATENT DOCUMENTS

| | | | | |
|---|---|---|---|---|
| 2,294,001 A | * | 8/1942 | Ritter | 206/537 |
| 2,865,533 A | * | 12/1958 | Taylor | 221/199 |
| 2,885,110 A | * | 5/1959 | Tregilgas | 221/198 |
| 2,885,116 A | * | 5/1959 | Tregilgas | 221/198 |
| 2,926,789 A | * | 3/1960 | Cranmore | 211/49.1 |
| 3,270,915 A | * | 9/1966 | Auer | 221/2 |
| 3,688,945 A | * | 9/1972 | Harman, Jr. et al. | 221/280 |
| 3,854,625 A | * | 12/1974 | Kuebler | 221/198 |
| 4,174,048 A | * | 11/1979 | Volpe, Jr. | 221/267 |
| 4,474,308 A | * | 10/1984 | Bergeron | 221/24 |
| 5,048,720 A | * | 9/1991 | Hoke | 221/198 |
| 5,080,258 A | * | 1/1992 | Hinterreiter | 221/198 |
| 5,178,298 A | * | 1/1993 | Allina | 221/24 |
| 5,191,995 A | * | 3/1993 | McDonald | 221/24 |
| 5,222,627 A | * | 6/1993 | Coleman, Jr. | 221/210 |
| 5,366,113 A | * | 11/1994 | Kim et al. | 221/232 |
| 5,673,814 A | * | 10/1997 | Terashima et al. | 221/227 |

* cited by examiner

*Primary Examiner*—Daniel P. Stodola
*Assistant Examiner*—Jennifer E. Novosad
(74) *Attorney, Agent, or Firm*—Melvin L. Crane

(57) ABSTRACT

A candy holder for holding candy or gum having a hole in a center of the candy or gum. The device includes a housing with an aperture with three different sized diameters in order from an upper end of the housing to the bottom end, a spring assembly forces a plunger shaft upwardly as candy or gum is removed from a candy holder secured axially in the housing. As the candy is removed from an upper end of the candy holder, the plunger is spring forced against the candy to force the candy toward an upper end of the candy holder.

4 Claims, 1 Drawing Sheet

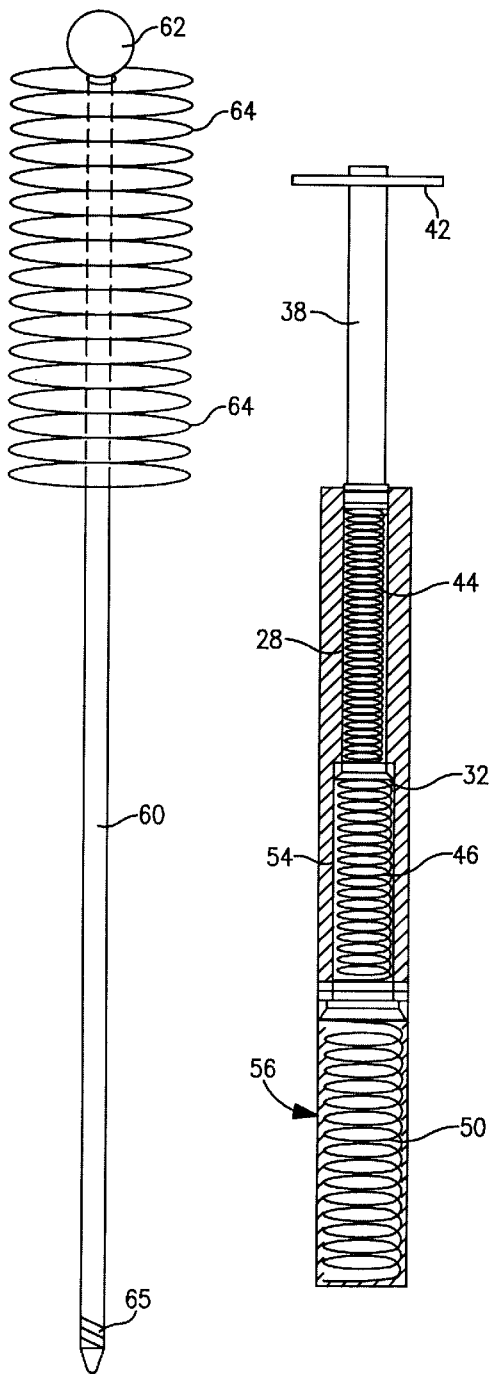
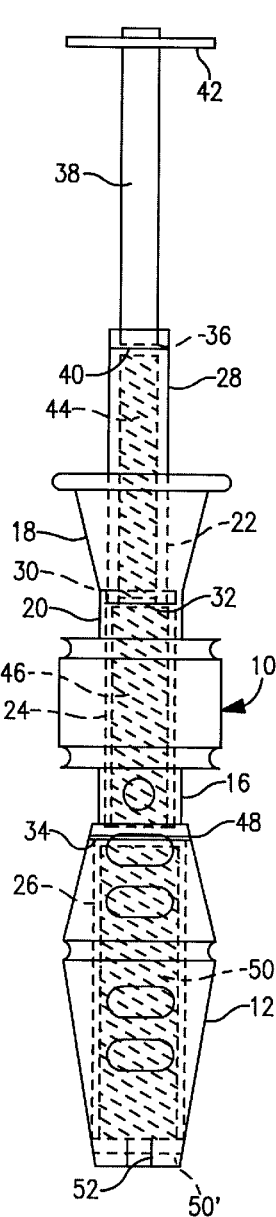
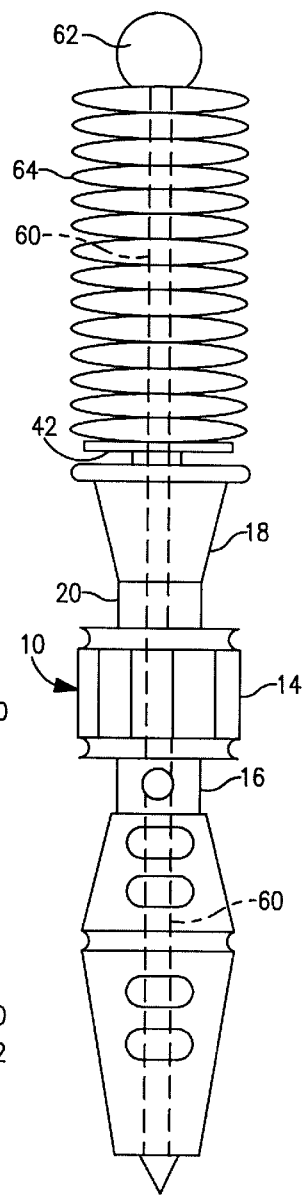
FIG. 3　　FIG. 2　　FIG. 1　　FIG. 4

CANDY HOLDER WITH SPRING-UPS

CROSS REFERENCE TO RELATED APPLICATIONS

This application is a continuation-in-part of application Ser. No. 09/480,852 filed on Jan. 11, 2000, now abandoned.

BACKGROUND OF THE INVENTION

This invention is directed to a candy dispenser and more particularly to a candy dispenser which depends upon springs to move the candy up to a candy seat from which the candy pieces can be removed for consumption.

Heretofore various items have been dispensed by use of springs which force the items up to a position for removal from a holder.

SUMMARY OF THE INVENTION

It is therefore an object of the invention to provide a candy or gum dispenser in which the candy or gum has a hole therein and is held on a linear candy holder.

Another object is to provide a candy dispenser which contains springs which apply a force on the pieces of candy or gum to position the candy pieces in a position for dispensing.

Still another object is to provide a candy dispenser in which the pieces are retained onto a candy holder until the candy is removed by a consumer.

Yet another object is to provide a candy dispenser which is spring loaded in which the springs force the candy pieces in order to a position for being dispensed subsequent to removal of each piece of candy.

Other objects and advantages will become obvious to those skilled in the art upon a review of the drawings, specification and claims.

BRIEF DESCRIPTION OF THE DRAWINGS

FIG. 1 is a side view of the device illustrating the relative parts without any candy or gum in place;

FIG. 2 illustrates a sectional view of a modification of the springs and cylinders in which the springs are held;

FIG. 3 illustrates a candy holder shaft with candy pieces in place on end; and

FIG. 4 illustrates a side view with candy pieces loaded for being dispensed.

DETAILED DESCRIPTION

Now referring to the drawings wherein the same reference characters represent the same parts in the different drawings, there is shown in FIG. 1 a side view of a complete candy or gum (candy) dispenser shown without any candy pieces in place for being dispensed. The device is shown as if made of clear plastic so that the various parts can be viewed through the housing 10. The housing 10 is made with an outer surface which may be of any desired shape by which a user can hold the device. The housing is shown with adjoining conical portions 12 which are joined to a cylindrical portion 14 by a cylindrical section 16. The cylindrical portion 14 is joined to a conical portion 18 by use of a second cylindrical section 20. The housing has an axially extending aperture which is formed by cylindrical inner diametrical is surfaces of increasing inner diameter 22, 24, 26. The smallest cylindrical inner surface 22 includes an inner cylinder 28 which has an upper end which extends outwardly of the upper conical portion 18. The middle inner diametrical surface 24 is greater than the upper inner diametrical surface 22 and forms a shoulder 30 at the joint between the bottom end of the upper cylinder diametrical surface 22 and of the upper end of the middle diametrical surface 24. The lower end of the inner cylinder 28 includes an end plate 32 of a lesser outer diameter than that of the inner diametrical surface of the middle housing portion 24 and which fits below the shoulder 30. Thus, the inner cylinder can be moved axially within the aperture in the middle housing portion. The lower end of the middle inner diametrical surface joins the upper end of the lower diametrical surface 26 which forms an inwardly extending shoulder 34 at the joint. The upper end of the inner cylinder is provided with an inwardly extending shoulder 36. A plunger shaft 38 has a bottom end with an outwardly extending shoulder 40 or is provided with an end plate which has a smaller outer diameter than the inner diametrical surface of the inner cylinder 28 so that the plunger shaft is prevented from being removed from the inner cylinder by the inwardly extending shoulder 36 and the outwardly extending shoulder or bottom plate 40. The upper end of the plunger shaft 38 is provided with a candy seat 42.

As shown, a first spiral spring 44 is included within the inner cylinder 28. The upper end of the spiral spring seats on the bottom end plate 40 of the plunger shaft and the lower end of the first spiral spring seats on the end plate 30 which is held in the aperture in the middle housing portion. A second spiral spring 46 is confined in the aperture of the middle housing portion. The upper end of the second spiral spring seats on the spacer plate 32 which separates the upper end of the second spiral spring from the lower end of the first spiral spring. The lower end of the second spiral spring seats on a second spacer plate 48 which is confined within the aperture in the bottom housing portion by the shoulder at the joint between the lower end of the aperture in the middle housing portion and the upper end of the aperture in the bottom housing portion. A third spring 50 is confined in the aperture of the bottom housing portion between the second spacer plate 48 and a bottom plate 50' of the bottom housing portion. The bottom plate is provided with an axially threaded aperture 52 which will be explained later. The spacer plates and spiral springs are of a diameter that they can move axially within their respective axial apertures and are confined within their respective axial apertures.

FIG. 2 illustrates a modification of the device shown in FIG. 1. As shown in FIG. 2, the first and second spiral springs 44 and 46 are confined within cylinders 28 and 54, respectively. The lowermost spring 50 is confined in an elongated cylinder 56 which extends upwardly with a uniform diameter to surround the cylinders 28 and 54. For this modification the inner diameter of the housing 10 is of a uniform diameter in which the cylinder 56 fits with a tight fit. The inner cylinder 28 and plunger shaft 38 are the same as shown in FIG. 1. Spacer plates and shoulders as set forth above are provided to confine the second and third spiral springs within the apertures of the cylinders.

FIG. 2 illustrates an insert including three different diameter cylinders. The insert is inserted into the housing shown in FIG. 1 which has inner surface diameters that mate with the outer diameter surfaces of the cylinders with a tight fit. FIG. 2 is shown with an outer cylinder 56 of one diameter as an insert into a housing in which the inside diameter of the housing would be of the same diameter over the length of the housing and the cylindrical insert as shown in FIG. 2 would slip into the inner cylinder of the housing and would operate as set forth above for the spring loaded candy dispenser of FIG. 1. The thickness of each of the cylinders should be the same thickness; however, they could be of a different thickness if one desired.

FIG. 3 illustrates a candy holder which is used with the candy dispenser shown in FIGS. 1 and 2. The candy holder 60 is an elongated rod which is provided with a cylindrical ball 62 at the upper end which confines candy or gum pieces 64 on the candy holder. The bottom end of the candy holder is provided with threads 65 which thread into the threaded aperture 52 of the end plate 50' in the aperture in the bottom housing portion. As shown, the candy holder is provided with pieces of candy or gum which are to be dispensed from the candy dispenser. The rod 60 passes through the plunger shaft and springs and is secured to the bottom plate 50'. The candy or gum has a central hole which fits over the rod 60. In removing the candy, the candy is lifted over the ball 62 or may be pulled to one side to break the piece of candy. As the upper piece is removed, the spring will move the candy seat and pieces of candy upwardly with the uppermost piece of candy against the ball 62 from which the next piece of candy can be removed. Thus, the candy or gum pieces can be removed in succession. As the candy pieces are removed, the springs force the the plunger 38 upwardly against the candy seat until all pieces of candy are removed. It should be obvious to one skilled in the art that the candy pieces, plunger shaft 38, and each the springs can move freely on the candy holder 60.

FIG. 4 illustrates a side view of a candy dispenser on which pieces of candy are provided.

In operation of the dispenser, candy pieces or gum that have a central aperture, such as LIFESAVERS, are fitted onto the candy holder with the upper end of the candy holder outside of the dispenser device. The threaded end of candy holder 60 is pushed through the plunger shaft 38, inner cylinder 28, middle 20 and bottom housing portion 12 and the threaded end 65 of the candy holder is threaded onto the threaded aperture 52 in the bottom plate 50. As the candy holder is forced downwardly through the springs, etc., the candy seat 42 on the plunger shaft is forced against the first spiral spring and inner cylinder. The first spiral spring and inner cylinder will force the second spring against the end plate 32 which in turn forces the third spiral spring downwardly. The distance of travel for the springs, etc., depends upon the amount of candy placed on the candy holder. The plunger shaft inner cylinder, etc., can be forced downwardly only until the candy seat 42 can seat on the upper end of the upper housing portion 18. As pieces of candy are removed from the upper end of the candy holder, the springs will force the plunger shaft, etc., upwardly until each of the pieces of candy have been removed. Then the candy holder can be reloaded and replaced on the dispenser for future use.

In assembly of the candy dispenser, the housing is made with the inner apertures of increasing diametrical inner surfaces 22, 24, 26 along the three different housing portions with the smallest diameter at the upper end. The plunger shaft is inserted into the inner cylinders and is prevented from passing through the upper end by the shoulder 30 on the inner cylinder 28 and end plate 32 on the plunger shaft.

The first spiral spring 44 is inserted into the inner cylinder 28. The inner cylinder 28 with the plunger shaft therein is passed into the housing through the bottom end and the inner cylinder is prevented from passing through the middle housing cylinder 20 because of the shoulder 30 formed in the aperture and the spacer plate 32 or shoulder on the lower end of the inner cylinder. The second spiral spring 46 is then inserted into the housing until the upper end of the second spring is seated on the first spacer 32 or bottom end of the inner cylinder. The second spacer 48 is then inserted into the housing which seats on the lower end of the second spiral spring and is prevented from passing through the upper end of the housing 26 into the middle portion of the aperture by the shoulder on the upper end of the bottom aperture portion or the spacer plate 48.

The third spacer plate 48 is pushed into the outer cylinder 12 so that the bottom end of the second spring 46 seats on the third spacer plate 46. The third spacer plate will be prevented from passing into the middle cylinder by the shoulder 34 formed by the upper end of the outer cylinder at the lower end of the middle cylinder. The third spring is pushed into the outer cylinder with the upper end of the third spring seated against the third spacer plate. The end plate 52 with the axial threaded aperture 52 is secured to the lower end of the aperture in the bottom housing portion. The candy seat 42 can then be secured to the upper end of the plunger shaft. The pieces of candy can be placed on the candy holder and the candy holder can be secured in place on the housing by use of the threaded end and threaded balloon plate aperture.

The assembly of the spring cylinder configuration shown in FIG. 2 would be substantially the same as set forth above except that the cylinders with the springs therein would be inserted in order into the cylinder aperture of the housing. It would be obvious to one skilled in the art that the housing can be of any desired shape on the outer surface and can be painted to include any form desired. The housing should be made of any desired material with smooth surfaces to prevent injury to a user. Further, the housing could be made with an axial aperture which has only one spring which would move a plunger shaft as candy is removed from a candy holder.

The foregoing relates to preferred exemplary embodiments of the invention, it being understood that other variants and embodiments thereof are possible within the spirit and scope of the invention, the latter being defined by the appended claims.

What is claimed is:

1. A candy holder dispenser which comprises a housing, an axial aperture in said housing, at least first and second open-ended axially aligned cylinders in said aperture in which a lower end of said second cylinder interfits into an upper end of said first cylinder, an axially directed shoulder in said aperture on an inner surface of said housing which secures said first cylinder in said axial aperture, an axially directed shoulder in an upper end of said first cylinder and an outwardly extending shoulder on a lower end of said second cylinder which interconnects said second cylinder to said first cylinder, a first spring in said first cylinder that extends along a length of said first cylinder, a second spring in said second cylinder which extends along a length of said second cylinder, a spacer in said first cylinder which separates an upper end of said first spring from a lower end of said second spring, a cylindrical plunger shaft having a lower end that extends into an upper end of said second cylinder, said upper end of said second cylinder having an axially directed shoulder and a lower end of said plunger shaft having an outwardly directed shoulder which retains the lower end of said plunger shaft within the upper end of said second cylinder, a spacer in the upper end of the second cylinder which separates an upper end of said second spring from the lower end of said plunger shaft, and a candy holder which extends along the axis of the plunger shaft, and the first and second cylinders with the candy holder secured to an enclosure at a bottom of said housing and said first cylinder, said plunger shaft includes a plate at an upper end by which pieces of candy are adapted to be retained on said candy holder between said plate and an upper end of said candy holder, and said first and second springs apply a spring force on a bottom end of the plunger shaft which forces the plunger shaft upwardly as candy is removed from an upper end of the candy holder.

2. A candy holder dispenser as set forth in claim 1, in which a bottom end of the cylinder with the greatest inner diameter is enclosed by a bottom plate, said bottom plate includes an axial threaded aperture, and said candy holder is an elongated pin that passes through said axially aligned inner cylinders, said candy holder has a threaded bottom end that threads into said threaded aperture and said candy holder is of sufficient length such that an upper end of the candy holder extends from an upper end of the plunger shaft to accommodate pieces of candy between said plunger plate and an upper end of the candy holder.

3. A candy holder dispenser which comprises a tubular housing, an axial aperture of uniform diameter in said housing defining an elongated cylinder (56), first (28) and second (54) open-ended axially aligned cylinders in the elongated cylinder in which a lower end of the first cylinder interfits into an upper end of the second cylinder, an axially directed shoulder on an upper end of the second cylinder and an outwardly extending shoulder on a lower end of the first cylinder which interconnects the first cylinder to the second cylinder, a first spring in said first cylinder that extends along a length of said first cylinder, a second spring in said second cylinder which extends along a length of said second cylinder, a spacer in the second cylinder which separates a lower end of the first spring from an upper end of the second spring, a third spring in a lower portion of the elongated cylinder (56), a spacer between an upper end of the third spring and a lower end of the second spring, a cylindrical plunger shaft (38) having a lower end that extends into an upper end of the first cylinder, an upper end of the first cylinder having an axially directed shoulder and a lower end of said plunger shaft having an outwardly directed shoulder which retains the lower end of said plunger shaft within the upper end of the first cylinder, a spacer in the upper end of the first cylinder which separates an upper end of the first spring from the lower end of said plunger shaft, and a candy holder which extends along the axis of the plunger shaft, and the first (28), second (54) and the elongated cylinders (56) with the candy holder secured to a bottom plate of said housing, said plunger shaft includes a plate at an upper end by which pieces of candy are retained on said candy holder between said plate and an upper end of said candy holder, and said first, second and third springs apply a spring force on a bottom end of the plunger shaft which forces the plunger shaft upwardly as candy is removed from an upper end of the candy holder.

4. A candy holder dispenser as set forth in claim 3, in which the bottom plate includes an axial threaded aperture, and said candy holder is an elongated pin that passes through said plunger shaft, the springs, and each of the cylinders, said candy holder has a threaded bottom end that threads into said threaded aperture and said candy holder is of sufficient length such that an upper end of the candy holder extends from an upper end of the plunger shaft to accommodate pieces of candy between said plunger plate and an upper end of the candy holder.

* * * * *